May 6, 1930.                W. DUBILIER                1,757,658
                          ELECTRIC SADIRON
                        Filed April 29, 1926        2 Sheets-Sheet 1
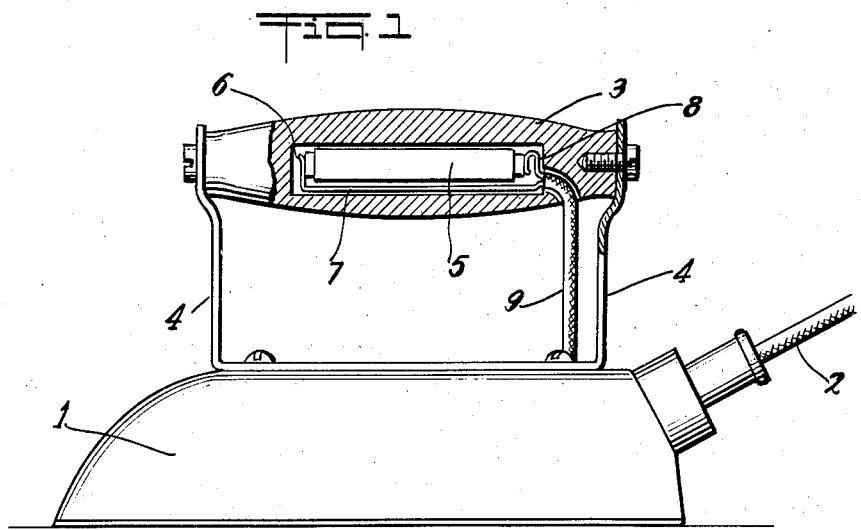
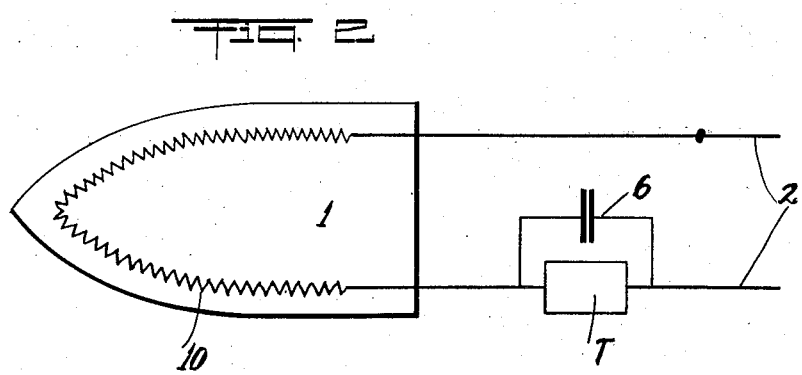
INVENTOR
William Dubilier
BY
William F. Nickel
ATTORNEY May 6, 1930.  W. DUBILIER  1,757,658
ELECTRIC SADIRON
Filed April 29, 1926   2 Sheets-Sheet 2
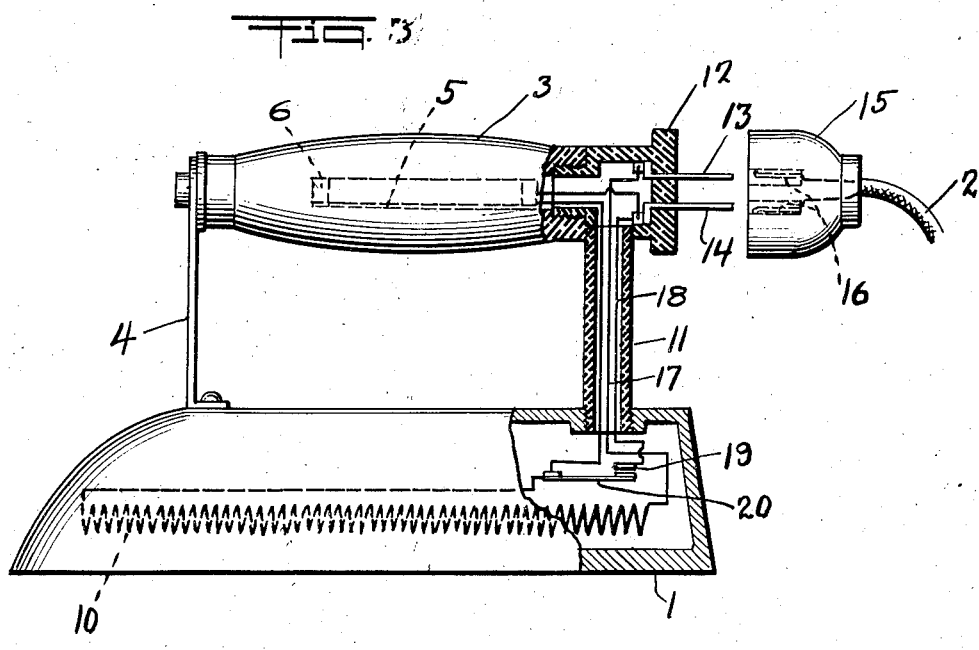
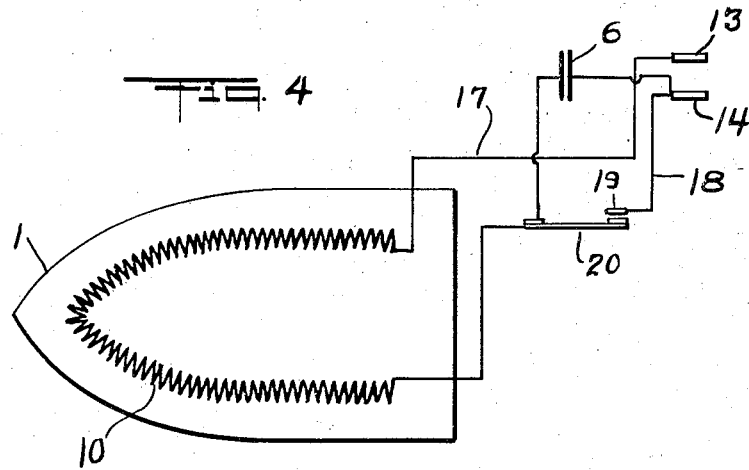
INVENTOR
William Dubilier
BY
William F. Nickel
ATTORNEY Patented May 6, 1930

1,757,658

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRIC SADIRON

Application filed April 29, 1926. Serial No. 105,599.

This invention relates to improvements in electrically heated sad irons for smoothing articles of apparel; and is directed particularly to sad irons bearing electrical condensers.

In such irons condensers are frequently employed with circuit breaking devices which automatically operate upon a certain temperature being reached. An object of this invention is to provide such an iron with a condenser mounted in the most convenient manner.

The nature and advantages of the invention will appear from the following description, taken with the accompanying drawings, which disclose the best form of my invention now known to me; but I, of course, reserve the right to vary the structure herein explained without departing from the principle of the invention, as indicated by the broad meanings of the terms of the appended claims.

On said drawings:

Figure 1 is a side view partly in section, of a sad iron, according to my invention.

Figure 2 shows diagrammatically the electric heating circuit for same.

Figure 3 is a view similar to Figure 1 showing a modification; and

Figure 4 is a view similar to Figure 2 showing a modification.

The same numerals identify the same parts throughout.

On the drawings the numeral 1 indicates the hollow body of the iron containing the electrical heating coil energized by current supplied through the cord 2. This iron has a handle 3 connected to the body by arms 4; and inside this handle is an electrical condenser 5, disposed in a chamber 6. The two terminals of the condenser are united to conductors 7 and 8, forming a cord 9 which extends to the handle from the body 1.

Figure 2 shows diagrammatically a heating coil 10 in the body 1, connected to the conductors in the cord 2. At 6 the condenser is indicated as in parallel with the thermostatic circuit breaking device T. When this thermostat breaks the heating circuit, the condenser prevents sparking. By mounting this condenser in the handle I dispose it to the best advantage, because space in the body 1 is thus saved; and the condenser is thus mounted in a place which is kept cool and is therefore not likely to be injuriously affected by the heat. Therefore an inexpensive paper-insulated condenser can be utilized.

In Figure 3, one end of the handle 3 is supported by an arm 4, and the other by a hollow post 11 which is affixed at its lower end to the body 1 of the iron and at its upper end to a hollow closure for the adjacent end of the handle 3 in which the condenser 5 is placed. This closure 12 has two conductive tongues 13 and 14 projecting from it to enter recesses in a plug 15 to which the cord 2 containing the conductors leading to the supply circuit is attached. In the plug 15 are two conductors 16, one attached to each wire in the cord 2, and when the plug 15 is connected to the iron, the contact tongues engage the contact pieces 16 in the plug 15. The contact 13 is joined by a wire 17 passing down through the post 11 to one end of the heating coil 10 in the body of the iron 1; and the other contact 14 is joined by a wire 18 passing down through the post 11 to a contact 19 in the body 1. This contact 19 engages a thermostatic member 20 joined to the other extremity of the heating coil 10. When the member 20 engages the contact 19, the circuit is completed, but on a rise in temperature, the member 20 moves away from the contact 19 to break the circuit. The condenser 6 is bridged across the contact 19 and member 20 by being connected at one end to the contact 14, and at the other end to the member 20. The diagram of circuits is as shown in Figure 4. This construction permits the iron to be joined in circuit by a plug engaging one end of the handle, instead of being attached to the body as in Figure 1.

My invention may be used on either direct or alternating current.

Having described my invention, what I believe to be new, and desire to secure and protect by Letters Patent of the United States is:—

1. An electrically heated device comprising a heating means and a body to be heated, a heat insulating handle for the body, and an electrical condenser disposed in said handle in operative relation with the heating means.

2. An electrically heated device comprising a body to be heated, a heat insulating handle for the body, an electrical condenser disposed in said handle, the condenser having dielectric material which is not adapted to withstand the heat produced by the device, an electric heating coil and circuit breaker in the body, the condenser being bridged across the circuit breaker.

3. An electrically heated device comprising a body to be heated, a heat insulating handle for the body, and an electrical condenser disposed in said handle in combination with an electric heating coil and circuit breaker in the body, the condenser being bridged across the circuit breaker, and a connecting cord leading to the coil through one end of the body.

4. An electrically heated device comprising a body to be heated, a heat insulating handle for the body, an electrical condenser in the body in combination with an electric heating coil, a circuit breaker in the body, said condenser being bridged across said circuit breaker, and terminals for said circuit projecting from one end of the handle.

5. An electric heating device having a body to be heated, a heating coil within the body, a circuit breaker therefor, a heat insulating handle for the device, a condenser connected across the circuit breaker to absorb the arc when the circuit is opened, the condenser being positioned in the handle of the device to insulate the same from the heat produced by the device.

6. An electric sadiron comprising a body to be heated, a heating coil within the body and a thermostatic circuit breaker for controlling the temperature of the iron, a heat insulating handle for the iron, a paper condenser positioned therein and insulated thereby from the heat produced by the iron, and means for connecting the condenser across the circuit breaker to absorb the arc when the breaker is opened.

In testimony whereof I affix my signature.

WILLIAM DUBILIER.